June 28, 1955 S. L. LARSON 2,711,592
VEHICLE DRYING APPARATUS
Filed May 26, 1953 2 Sheets-Sheet 1

Inventor:
Sherman L. Larson.
By Fulwider, Mattingly and Babcock
Attys

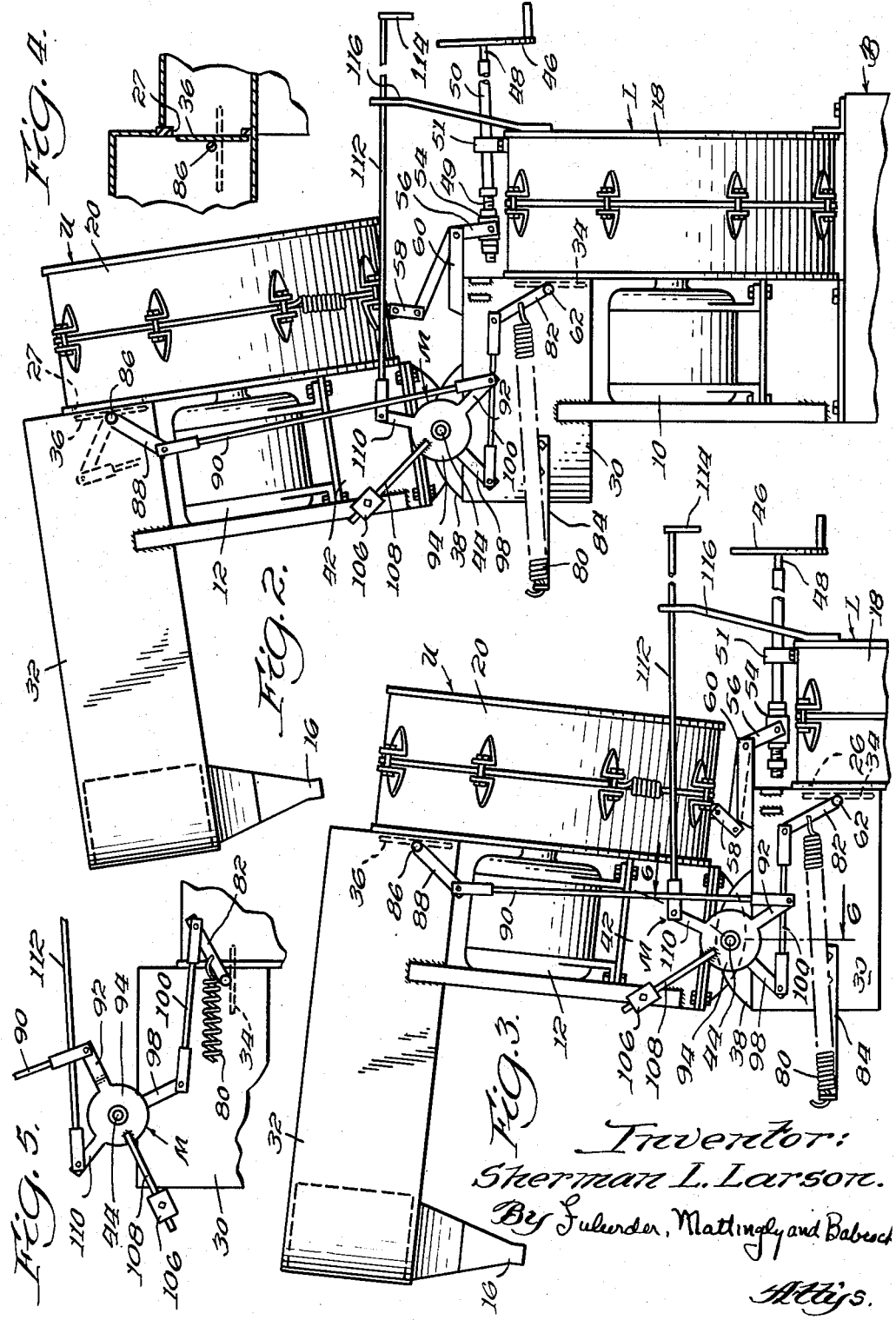

United States Patent Office 2,711,592
Patented June 28, 1955

2,711,592

VEHICLE DRYING APPARATUS

Sherman L. Larson, Culver City, Calif.

Application May 26, 1953, Serial No. 357,520

13 Claims. (Cl. 34—54)

The present invention relates generally to the field of blowers, and more particularly to a novel vehicle drying apparatus to be used in conjunction with a mechanized vehicle laundering system.

In the conventional mechanized vehicle laundering system, a vehicle to be laundered is moved along a straight line by a power-driven chain, first past a plurality of water-dispensing nozzles, and then past a plurality of blowers. These blowers are adapted to force heated air over the vehicle's surfaces in order to effect the rapid drying thereof. Such blowers are generally driven by electric motors, and once a working period has commenced, the electric motors are generally left running until the work period is over. This is true even though there will be times when a vehicle is not positioned adjacent the blowers. Accordingly, the operation of conventional blowers of this type is extremely wasteful of electrical energy.

It is a major object of the present invention to provide an improved form of blower which is highly efficient in operation.

Another object of the invention is to provide a vehicle drying apparatus incorporating blowers driven by electrical motors and having novel means for conserving the electrical energy required by such motors.

The vehicle drying blower outlet nozzles of a mechanized vehicle laundering system are generally disposed at the top and at the sides of the path followed by a vehicle moving along the system. In the operation of such system, both automobiles and trucks or buses may be cleaned. Inasmuch as the height of these varying types of vehicles differs, it is important that the top nozzles be adjustable in elevation whereby they may be spaced close to the vehicle's upper surface as the latter passes thereunder.

It is a further object of the present invention to provide an improved vehicle drying apparatus having a top outlet nozzle which is adjustable in elevation.

It is a more particular object of the present invention to provide a vehicle drying apparatus having a blower formed with an outlet, normally-closed blocking means for this outlet, and means actuated by a vehicle moving past the blower for opening the blocking means when the vehicle is positioned adjacent the blower. With this arrangement, during the time no vehicle is positioned adjacent the blower, the electrical energy requirements of the electric motor driving the blower will be comparatively small. This is true because the blower does not move any air when the blocking means is disposed in front of the outlet.

An additional object of the present invention is to provide a vehicle drying apparatus of the aforementioned nature which is entirely automatic in operation.

A further object of the invention is to provide a vehicle drying apparatus which is simple in design and rugged of construction whereby it may have a long service life.

These and other objects of the present invention will become apparent from the following detailed description of a preferred embodiment thereof, when taken in conjunction with the appended drawings wherein:

Figure 2 is a side elevational view of said apparatus;

Figure 3 is a side elevational view of said apparatus generally similar to Figure 2 but showing certain of its parts arranged in different positions;

Figure 4 is a fragmentary vertical sectional view taken on line 4—4 of Figure 1;

Figure 5 is a fragmentary side elevational view of a detail of said apparatus; and, Figure 6 is a vertical sectional view taken on line 6—6 of Figure 3.

Figure 1:
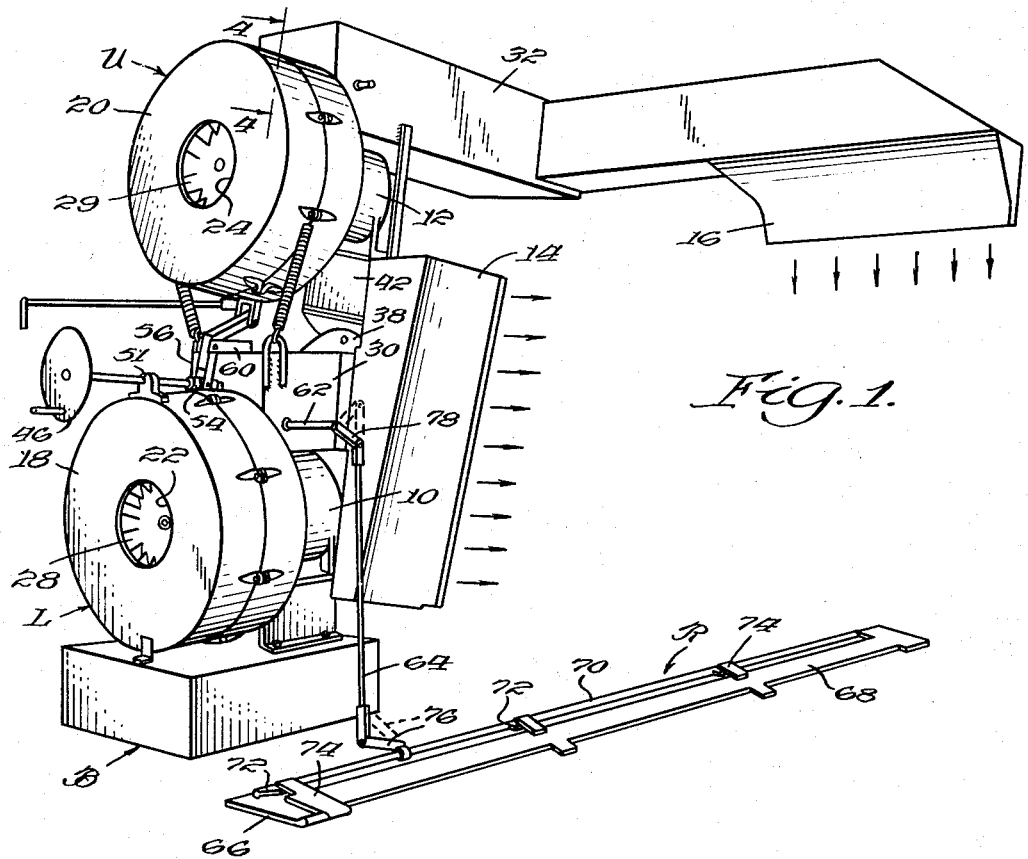
Figure 1 is a general perspective view of a preferred form of vehicle drying apparatus embodying the present invention.

Referring to the drawings, and particularly Figure 1 thereof, for the general arrangement of the preferred form of vehicle drying apparatus embodying the present invention, the apparatus broadly comprises a base B mounting a pair of blowers L and U driven by electric motors 10 and 12, respectively. The outlet of the lower blower L is connected to a side nozzle 14, while the outlet of the upper blower U is connected to a top nozzle 16. These nozzles serve to direct air over the top and one side of the vehicle passing by the apparatus. It should be understood that the apparatus shown in Figure 1 is adapted to be utilized in conjunction with other apparatus (not shown) having another side nozzle; which nozzle would be disposed at the right side of the nozzle 14. Control over the blowers L and U is adapted to be provided in part by a triggering ramp R to be fully described hereinafter.

Referring now to the other figures, each of the blowers L and U include a cylindrical two-piece casing designated 18 and 20, respectively, formed with frontal coaxial inlets 22 and 24, respectively, and with rectangular outlets 26 and 27, respectively, formed in the casing's rear end walls. A fan or impeller 28 is rotatably supported within the lower blower casing 18, and a similar fan or impeller 29 is rotatably supported within the upper blower casing 20. The side nozzle 14 is connected to the lower blower's outlet 26 by means of a rectangular duct 30, while the top nozzle 16 is connected to the upper blower's outlet nozzle 27 by a rectangular duct 32. A blocking means in the form of a rectangular gate 34 is provided for the lower blower outlet 26. A similar gate 36 is provided for the upper blower outlet 27. When these gates 34 and 36 are in a closed position, no air may pass through the outlets 26 and 27 whereby no air will pass through the lower and upper blowers. Accordingly, since the fans 28 and 29 do not move any air when these gates are in a closed position the electric motors 10 and 12 will require a minimum amount of electrical energy to rotate these fans at this time. In the operation of the preferred form of apparatus, the gates 34 and 36 are normally biased to a closed position. However, when a vehicle runs onto the triggering ramp R, these gates will be moved to an open position whereby air will be forced through the nozzles 14 and 16 onto the vehicles' surfaces.

By comparing Figures 2 and 3, it will be noted that the top nozzle 16 is adjustable in elevation; such adjustability being provided in order to accommodate vehicles of varying heights. It should be particularly observed that the present invention contemplates novel means for controlling the position of the upper gate 36 regardless of the elevation of the top nozzle 16, which means is fully set forth hereinafter.

With regard to a more specific description of the preferred form of vehicle drying apparatus embodying the present invention, a lower assembly comprising the base B, the lower blower L, the electric motor 10, the side nozzle 14, and the duct 30, are adapted to remain stationary relative to the ground. An upper assembly comprising the upper blower U, an electric motor 12, top nozzle 16, and the duct 32, pivot about a horizontal axis relative to the lower assembly whereby the elevation of the top nozzle 16 may be adjusted. To this end, the upper portion of the lower duct 30 is formed with a pair of aligned spaced ears 38, which ears are coupled to a pair of complementary spaced ears formed on the lower portion of a sub-base 42 by a horizontal shaft 44. The sub-base 42 rigidly mounts the upper blower U and the electric motor 12. The elevation of the top nozzle 16 relative to the ground may be adjusted by means of a crank 46 mounted by one end of a shaft 48. The opposite end of this shaft is of enlarged diameter and is formed with external threads 49. A tube 50 is keyed to the shaft 48 so as to anchor it against axial movement relative to a bearing 51 secured to the top of the lower blower casing 18. The threads 49 are shown engaged with a nut element 54 pivotally secured to the lower end of a tilting arm 56; the upper end of this arm being pivotally secured between a pair of links 58, and the intermediate parts of this arm being pivotally mounted by a brace 60. The brace 60 is rigidly attached to the lower duct 30. The upper ends of the links 58 are pivotally connected to the underside of the upper blower casing 20. With this arrangement, rotation of the crank 46 effects concurrent rotation of the shaft 48 so as to cause the nut element 54 to move axially along the threads 49. Such axial movement of the nut element causes simultaneous rotation of the tilting arm 56 to occur whereby the upper end thereof will move the upper casing 20 toward or away from the top of the lower casing 18. In this manner the entire upper assembly is caused to pivot relative to the lower assembly.

The lower gate 34 preferably takes the form of a flat plate rigidly secured at its mid-portion to a horizontal shaft 62; this shaft being rotatably journaled by the side walls of the lower duct 30. Rotation of this shaft 62 and hence the position of the gate 34 is controlled by the triggering ramp R, to which end the shaft 62 is connected to the triggering ramp by a rod 64. The triggering ramp R includes a flat base element 66, a tire-engaging element 68, and a shaft 70 journaled upon the upper surface of the base element 66. The shaft 70 rigidly mounts a plurality of spaced fingers 72 which abut the underside of similar fingers 74 formed upon the free end of the tire-engaging element 68. Normally the free ends of the tire-engaging element will be biased upwardly relative to the base element 66 by means to be set forth hereinafter. When a vehicle is run onto the tire-engaging element, however, its free end is depressed whereby the fingers 72 and 74 are urged downwardly. In this manner the shaft 70 is caused to undergo rotation. Such rotational movement is transferred from the shaft 70 to a crank arm 76 shown rigidly secured to the shaft 70 at one of its ends and pivotally secured to the lower end of the rod 64 at its other end. Hence, the rod 64 is caused to move upwardly by contact of a vehicle tire with the tire-engaging element 68. Such upward rod movement effects concurrent rotation of the lower gate shaft 62 by virtue of the interpositioning of the second crank arm 78 between the top vertical rod 64 and one end of this shaft 62. The lower gate 36 is normally biased to a closed position and the free end of the tire-engaging element 68 is normally biased upwardly by a helical tension spring 80 shown disposed between a link element 82 rigidly mounted by the end of the lower gate shaft 62 opposite the rod 64, and a brace 84 secured to the rear of the lower duct 30.

The upper gate 36 is generally similar to the lower gate 34 and it takes the form of a flat plate rigidly secured at its mid-portion to a horizontal shaft 86, which shaft 86 is rotatably journaled between the side walls of the upper duct 32. As shown in Figures 2 and 3, a crank arm 88 is rigidly to one side of this shaft 86. The free end of the arm 88 is pivotally attached to the upper end of a tie rod 90 having its lower end pivotally attached to a radially extending finger 92 formed on the output disc 94 of a clutch mechanism M. This clutch mechanism M includes an input disc 96 formed with a radially extending finger 98. This latter finger 98 is pivotally attached to one end of a horizontally extending rod 100; the opposite end of such rod being pivotally attached to the free end of the link element 82 mounted by the lower gate shaft 62. Rotation of the lower gate shaft 62 is adapted to be transferred to the upper gate shaft 86 through this clutch mechanism M in a manner to be described hereinafter.

Figure 6:
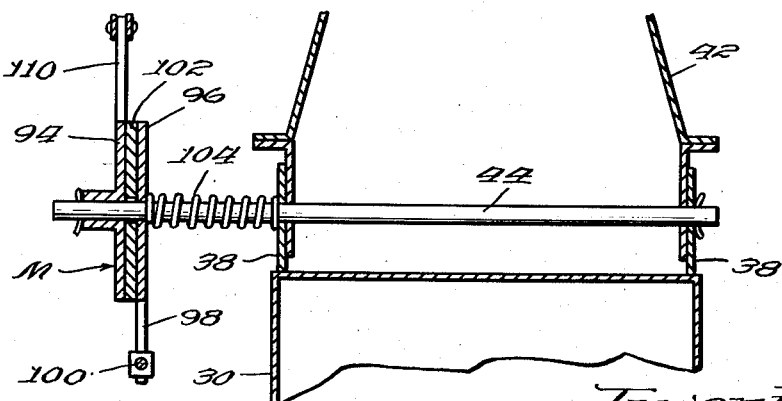

Referring particularly to Figure 6, the clutch mechanism M includes in addition to the output disc 94 and the input disc 96, an annular rotation-transferring disc 102 disposed therebetween, and helical compression spring 104 interposed between the output disc 94 and the left ear 38. All of these clutch components are coaxially journaled upon the shaft 44 which pivotally interconnects the upper and lower blower assemblies. The rotation-transferring disc 102 should be formed of a suitable composition material commonly utilized in clutch facings, while the other components will preferably be formed of metal. The output disc 94 may incorporate a counterbalance weight 106 which is mounted radially outwardly from the main body of the disc at a point diametrically opposite the finger 92 by a rod 108. The output disc 94 also includes a second radially extending finger 110 disposed intermediately of the finger 92 and the rod 108. The free end of this second finger 110 is pivotally connected to one end of an elongated bar 112 which rigidly mounts a handle 114 at its opposite end. The intermediate portion of the bar 112 is slidably supported by an upstanding brace 116 for axial movement relative thereto. The bar 112 and its handle 114 constitute an overcontrol means for the clutch mechanism M whereby the operator of the apparatus may control the position of the upper gate 36 independently of this clutch mechanism.

In the operation of the apparatus, assuming a plurality of passenger automobiles are initially to be washed the top nozzle 16 will be disposed at the lower elevation shown in Figures 1 and 2, whereby it will be spaced close to the top of the automobile passing thereunder. At the beginning of a working period the electric motors 10 and 12 will be started so as to cause the fans 28 and 29 to commence rotation. The automobiles will then be started in single file through the system. Before the first automobile passing through the system reaches the apparatus, both the lower and the upper gates 34 and 36 will be biased in a closed position by the tension spring 80. When the front wheel of the first automobile in the line reaches the tire-engaging element 68 and forces its free end downwardly, however, the lower gate shaft 62 will be caused to rotate the lower gate 34 to its open position indicated by dotted lines in Figure 5. Rotation of this gate shaft 62 will also effect simultaneous rotation of the clutch input disc 94 by virtue of the latter's connection therewith through rod 100 and link element 82. This input disc rotation, through the rotation-transferring disc 102, causes concurrent rotation of the output disc 96 whereby the tie rod 90 will be moved upwardly. This upward movement of the tie rod will force the crank arm 88 to be moved to its dotted line position shown in Figure 2 so as to effect rotation of the upper gate shaft 86. In this manner the upper gate 36 will be moved to its open position shown in dotted outline in Figure 4.

With the lower and upper gates disposed in an open position, air (preferably in a heated condition) will flow through the nozzles 14 and 16 onto the external surfaces of the automobile as the latter is being moved past the apparatus. When the rear wheel of the automobile passes off the tire-engaging element, the tension spring 80 will again pull the link 82 to its original position so as to rotate the lower gate 34 to its closed position. This movement of the link 82 will be transferred by rod 100 to the clutch mechanism M so as to effect simultaneous movement of the upper gate 36 to a closed position. The gates will remain in their closed position until the front wheel of the next automobile in the line engages the tire-engaging element 68. In this manner a considerable amount of electrical energy will be saved, since the fans 28 and 29 will only be pumping air during the time that an automobile is actually disposed adjacent the drying apparatus.

If one or more of the automobiles being washed is of the convertible type, it is necessary that the flow of air through the top nozzle 16 be cut off as the convertible passes therebelow, otherwise serious damage could occur to the convertible's cloth covering. Referring to Figure 2, and assuming that the front wheel of the convertible has engaged the tire-engaging element 68 of the triggering ramp R whereby both the upper and lower gates 34 and 36 are in an open position, the operator may by merely urging the over-control bar 112 to the left, shut off the flow of air through the top nozzle 16. This will cause the output disc 96 to be rotated independently of the input disc 94 so as to move the upper gate 36 to its closed position and thereby shut off the flow of air through the top nozzle 16. Once the convertible has been moved past the apparatus and off the triggering ramp the overcontrol bar 112 will automatically return to its original setting and the output disc 96 will return to its original position relative to the input disc 94. During the period that the upper gate 36 is closed, the lower gate 34 will remain open in order that the side of the convertible will be dried in the normal manner. Should the automobiles being cleaned be passing the apparatus bumper-to-bumper, it will be necessary to utilize the overcontrol bar in order to re-open the upper gate.

Referring to Figure 3, should it be desired to clean one or more trucks or busses, the top nozzle 16 may be readily moved to a higher elevation by means of the crank 46. Thereafter, it is generally necessary to re-adjust the setting of the upper gate 36 in order that it will normally be disposed in a closed position. This is easily accomplished by manipulation of the overcontrol bar 112. Thus, assuming that the wheels of the vehicle to be cleaned has not yet engaged the tire-engaging element 68 of this triggering element R and the lower gate is in its closed position, the bar 112 will be adjusted so as to dispose the upper gate 36 in its closed position. Thereafter, the operation of the apparatus is substantially identical to that described hereinbefore.

While there has been shown and described hereinbefore what is at present believed to be a preferred embodiment of the present invention, it will be apparent that various modifications and changes may be made thereto without departing from the spirit of the invention or the scope of the appended claims.

We claim:

1. Vehicle drying apparatus, comprising: a lower blower casing having an outlet; a lower nozzle connected to said outlet; a gate for said outlet, said gate normally being biased closed; an upper blower casing having a second outlet; an upper nozzle connected to said second outlet; a second gate for said second outlet, said gate normally being biased closed; vehicle-engaging means for automatically opening said gates when a vehicle is disposed adjacent said nozzles; and manually-operated overcontrol means for selectively closing said second gate independently of said vehicle-engaging means.

2. Vehicle drying apparatus, comprising: a lower blower casing having an outlet; a lower nozzle connected to said outlet; a gate for said outlet, said gate normally being biased closed; an upper blower casing having a second outlet; an upper nozzle connected to said second outlet; a second gate for said second outlet, said gate normally being biased closed; means for tilting said upper blower casing and upper nozzle relative to said lower blower casing; vehicle-engaging means for automatically opening said gates when a vehicle is disposed adjacent said nozzles; and, manually-operated overcontrol means for adjusting the positon of said second gate relative to said second outlet independently of said vehicle-engaging means.

3. Vehicle drying apparatus, comprising: a lower blower casing having a first outlet; a lower nozzle connected to said outlet; a first gate for said first outlet, said gate normally being biased closed; an upper blower casing having a second outlet; an upper nozzle connected to said second outlet; a second gate for said second outlet, said gate normally being biased closed; clutch means interposed between said gates; means connecting said first gate with the input side of said clutch means; means connecting said second gate with the output side of said clutch; means for tilting said upper blower casing and upper nozzle relative to said lower blower casing; a triggering ramp engageable by a vehicle; means connecting said ramp to said first-mentioned gate whereby both said gates will be automatically opened when a vehicle engages said ramp; and, manually-operated overcontrol means connected to the output side of said clutch for adjusting the position of said second gate independently of said triggering ramp.

4. Vehicle drying apparatus, comprising: a base; a lower blower casing mounted on said base, said lower blower casing being formed with an outlet; a lower duct secured to said lower blower; a lower nozzle connected to said lower duct; a lower horizontal shaft rotatably mounted by said lower blower casing; a first gate carried by said lower shaft and adapted to close said outlet; spring means connected to said lower shaft for normally causing said shaft to maintain said first gate in a closed position; a triggering ramp engageable by a vehicle; means connecting said ramp to said lower shaft and adapted to cause said shaft to move said first gate to an open position when a vehicle engages said ramp; a sub-base mounted by said lower duct; an upper blower casing secured to said sub-base, said upper blower casing being formed with a second outlet; an upper duct secured to said upper blower casing; an upper nozzle connected to said upper duct; an upper horizontal shaft rotatably mounted by said upper blower casing; a second gate carried by said upper horizontal shaft and adapted to close said second outlet; clutch means having an input member and an output member; means connecting said lower shaft to said input member; means connecting said upper shaft to said output member; and, a manually-operated overcontrol rod connected to said output member for adjusting the position of said second gate independently of said first gate.

5. Vehicle drying apparatus, comprising: a base; a lower blower casing mounted on said base, said lower blower casing being formed with an outlet; a lower duct secured to said lower blower; a lower nozzle connected to said lower duct; a lower horizontal shaft rotatably mounted by said lower blower casing; a first gate carried by said lower shaft and adapted to close said outlet; spring means connected to said lower shaft for normally causing said shaft to maintain said first gate in a closed position; a triggering ramp engageable by a vehicle; means connecting said ramp to said lower shaft and adapted to cause said shaft to move said first gate to an open position when a vehicle engages said ramp; a sub-base movably mounted by said lower duct; an upper blower casing rigidly secured to said sub-base, said upper blower being formed with a second outlet; an upper duct secured to said upper blower casing; an upper nozzle connected to said upper duct; means interposed between said blower casings for tilting said sub-base relative to said lower duct to thereby adjust the elevation of said upper nozzle; an upper horizontal shaft rotatably mounted by said upper blower casing; a second gate carried by said upper horizontal shaft and adapted to close said second outlet; clutch means having an input member and an output member; means connecting said lower shaft to said input member; means connecting said upper shaft to said output member; and, a manually-operated overcontrol rod connected to said output member for adjusting the position of said second gate independently of said first gate.

6. Vehicle drying apparatus, comprising: a base; a lower blower casing mounted on said base, said lower blower casing being formed with an outlet; a lower duct secured to said lower blower; a lower nozzle connected to said lower duct; a lower horizontal shaft rotatably mounted by said lower blower casing; a first gate carried by said lower shaft and adapted to close said outlet; spring means connected to said lower shaft for normally causing said shaft to maintain said first gate in a closed position; a triggering ramp engageable by a vehicle; means connecting said ramp to said lower shaft and adapted to cause said shaft to move said first gate to an open position when a vehicle engages said ramp; a pair of upstanding ears formed on said lower duct; a sub-base formed with a pair of depending ears; a horizontal support shaft extending between said ears so as to pivotally interconnect said sub-base to said lower duct for relative rotation about a horizontal axis; an upper blower casing rigidly secured to said sub-base, said upper blower being formed with a second outlet; an upper duct secured to said upper blower casing; an upper nozzle connected to said upper duct; means interposed between said blower casings for tilting said sub-base relative to said lower duct to thereby adjust the elevation of said upper nozzle; an upper nozzle connected to said upper duct; an upper horizontal shaft rotatably mounted by said upper blower casing; a second gate carried by said upper horizontal shaft and adapted to close said second outlet; clutch means carried by said support shaft and having an input member and an output member; means connecting said lower shaft to said input member; means connecting said upper shaft to said output member; and, a manually-operated overcontrol rod connected to said output member for adjusting the position of said second gate independently of said first gate.

7. Vehicle drying apparatus, comprising: a base; a lower blower casing mounted on said base, said lower blower casing being formed with an outlet; a lower duct secured to said lower blower; a lower nozzle connected to said lower duct; a lower horizontal shaft rotatably mounted by said lower blower casing; a first gate carried by said lower shaft and adapted to close said outlet; spring means connected to said lower shaft for normally causing said shaft to maintain said first gate in a closed position; a triggering ramp engageable by a vehicle; means connecting said ramp to said lower shaft and adapted to cause said shaft to move said first gate to an open position when a vehicle engages said ramp; a pair of upstanding ears formed on said lower duct; a sub-base formed with a pair of depending ears; a horizontal support shaft extending between said ears so as to pivotally interconnect said sub-base to said lower duct for relative rotation about a horizontal axis; an upper blower casing rigidly secured to said sub-base, said upper blower being formed with a second outlet; an upper duct secured to said upper blower casing; an upper nozzle connected to said upper duct; means interposed between said blower casings for tilting said sub-base relative to said lower duct to thereby adjust the elevation of said upper nozzle; an upper nozzle connected to said upper duct; an upper horizontal shaft rotatably mounted by said upper blower casing; a second gate carried by said upper horizontal shaft and adapted to close said second outlet; an input disc journaled by said support shaft; an output disc journaled by said support shaft; a rotation-transferring disc interposed between said input and output discs; a compression spring carried by said support shaft for biasing said discs together; means connecting said lower shaft to said input disc; means connecting said upper shaft to said output disc; and, a manually-operated overcontrol rod connected to said output disc for adjusting the position of said second gate independently of said first gate.

8. Vehicle drying apparatus, comprising: a lower blower casing having a first outlet; a lower nozzle connected to said outlet; a first gate for said first outlet, said gate normally being biased closed; an upper blower casing having a second outlet; an upper nozzle connected to said second outlet; a second gate for said second outlet, said gate normally being biased closed; clutch means interposed between said gates; means connecting said first gate with the input side of said clutch means; means connecting said second gate with the output side of said clutch; a triggering ramp engageable by a vehicle; means connecting said ramp to said first-mentioned gate whereby both said gates will be automatically opened when a vehicle engages said ramp; and, manually-operated overcontrol means connected to the output side of said clutch for adjusting the position of said second gate independently of said triggering ramp.

9. Vehicle drying apparatus, comprising: a lower blower casing having a first outlet; a lower nozzle connected to said outlet; a first gate for said first outlet, said gate normally being biased closed; an upper blower casing having a second outlet; an upper nozzle connected to said second outlet; a second gate for said second outlet, said gate normally being biased closed; clutch means interposed between said gates; means connecting said first gate with the input side of said clutch means; means connecting said second gate with the output side of said clutch; means for tilting said upper blower casing and upper nozzle relative to said lower blower casing; vehicle-engaging means operatively connected to said first-mentioned gate whereby both gates will be opened when a vehicle contacts said vehicle-engaging means; and, manually-operated overcontrol means connected to the output side of said clutch for adjusting the position of said second gate independently of said vehicle-engaging means.

10. Vehicle drying apparatus, comprising: a lower blower casing having a first outlet; a lower nozzle connected to said outlet; a first gate for said first outlet, said gate normally being biased closed; an upper blower casing having a second outlet; an upper nozzle connected to said second outlet; a second gate for said second outlet, said gate normally being biased closed; clutch means interposed between said gates; means connecting said first gate with the input side of said clutch means; means connecting said second gate with the output side of said clutch; vehicle-engaging means operatively connected to said first-mentioned gate whereby both gates will be opened when a vehicle contacts said vehicle-engaging means; and, manually-operated overcontrol means connected to the output side of said clutch for adjusting the position of said second gate independently of said vehicle-engaging means.

11. Vehicle drying apparatus, comprising: a lower blower casing having an outlet; a lower nozzle connected to said outlet; first means for controlling the flow of air through said lower nozzle, said means normally being biased closed; an upper blower casing having a second outlet; an upper nozzle connected to said second outlet; second means for controlling the flow of air through said upper nozzle, said means normally being biased closed; a clutch interposed between said first and second means, said first means being connected with the input side of said clutch and said second means being connected to the output side thereof; means for tilting said upper nozzle relative to said lower nozzle; a triggering ramp engagable by a vehicle, said ramp being operatively connected to said first means whereby said first and second means will allow air to flow through said lower and upper nozzles when a vehicle engages said ramp; and a manual overcontrol connected to the output side of said clutch for adjusting the flow of air through said upper nozzle independently of said triggering ramp.

12. Vehicle drying apparatus, comprising: a lower blower casing having an outlet; a lower nozzle connected to said outlet; first means for controlling the flow of air through said lower nozzle, said means normally being biased closed; an upper blower casing having a second outlet; an upper nozzle connected to said second outlet; second means for controlling the flow of air through said upper nozzle, said means normally being biased closed; a clutch interposed between said first and second means, said first means being connected with the input side of said clutch and said second means being connected to the output side thereof; a triggering ramp engagable by a vehicle, said ramp being operatively connected to said first means whereby said first and second means will allow air to flow through said lower and upper nozzles when a vehicle engages said ramp; and a manual overcontrol connected to the output side of said clutch for adjusting the flow of air through said upper nozzle independently of said triggering ramp.

13. Vehicle drying apparatus, comprising: a lower blower casing having an outlet; a lower nozzle connected to said outlet; first means for controlling the flow of air through said lower nozzle, said means normally being biased closed; an upper blower casing having a second outlet; an upper nozzle connected to said second outlet; second means for controlling the flow of air through said upper nozzle, said means normally being biased closed; a clutch interposed between said first and second means, said first means being connected with the input side of said clutch and said second means being connected to the output side thereof; vehicle-engaging means operatively connected to said first means whereby said first and second means will allow air to flow through said lower and upper nozzles when a vehicle engages said vehicle-engaging means; and a manual overcontrol operatively connected to the output side of said clutch for adjusting the flow of air through said upper nozzle independently of said vehicle-engaging means.

References Cited in the file of this patent

UNITED STATES PATENTS

| | | |
|---|---|---|
| 2,016,125 | Snow | Oct. 1, 1935 |
| 2,119,402 | Puffer | May 31, 1938 |
| 2,198,898 | Winters | Apr. 30, 1940 |
| 2,440,157 | Rousseau | Apr. 20, 1948 |